(12) United States Patent
Okabe et al.

(10) Patent No.: US 11,045,771 B2
(45) Date of Patent: Jun. 29, 2021

(54) COMPOSITE SEMIPERMEABLE MEMBRANE AND METHOD FOR PRODUCING SAME

(71) Applicant: TORAY INDUSTRIES, INC., Tokyo (JP)

(72) Inventors: Jun Okabe, Shiga (JP); Koji Nakatsuji, Ehime (JP); Tsuyoshi Hamada, Shiga (JP); Masaki Higashi, Ehime (JP)

(73) Assignee: TORAY INDUSTRIES, INC., Tokyo (JP)

( * ) Notice: Subject to any disclaimer, the term of this patent is extended or adjusted under 35 U.S.C. 154(b) by 29 days.

(21) Appl. No.: 15/771,346

(22) PCT Filed: Oct. 27, 2016

(86) PCT No.: PCT/JP2016/081967
§ 371 (c)(1),
(2) Date: Apr. 26, 2018

(87) PCT Pub. No.: WO2017/073698
PCT Pub. Date: May 4, 2017

(65) Prior Publication Data
US 2018/0311623 A1 Nov. 1, 2018

(30) Foreign Application Priority Data
Oct. 27, 2015 (JP) .............................. JP2015-211016

(51) Int. Cl.
*B01D 69/12* (2006.01)
*B01D 69/02* (2006.01)
*B01D 71/56* (2006.01)
*B01D 67/00* (2006.01)
*B01D 69/10* (2006.01)
*B01D 61/02* (2006.01)
*B01D 71/68* (2006.01)

(52) U.S. Cl.
CPC ....... *B01D 69/125* (2013.01); *B01D 67/0093* (2013.01); *B01D 69/02* (2013.01); *B01D 69/10* (2013.01); *B01D 71/56* (2013.01); *B01D 61/025* (2013.01); *B01D 61/027* (2013.01); *B01D 71/68* (2013.01); *B01D 2323/30* (2013.01); *B01D 2323/36* (2013.01); *B01D 2325/20* (2013.01); *B01D 2325/36* (2013.01); *Y02A 20/131* (2018.01)

(58) Field of Classification Search
CPC ...... B01D 69/125; B01D 69/02; B01D 71/56; B01D 69/10; B01D 2325/36; B01D 71/68; B01D 2323/30; B01D 2325/20; B01D 67/0093; B01D 61/025; B01D 61/027; B01D 2323/36; B01D 69/12; Y02A 20/131; C02F 1/44; C02F 2103/08
See application file for complete search history.

(56) References Cited

U.S. PATENT DOCUMENTS

| 6,177,011 | B1 | 1/2001 | Hachisuka et al. |
| 8,544,658 | B2 | 10/2013 | Stenzel et al. |
| 2004/0256309 | A1* | 12/2004 | Tomioka ............ B01D 67/0093 210/490 |
| 2011/0189469 | A1 | 8/2011 | Stenzel et al. |
| 2012/0241373 | A1 | 9/2012 | Na et al. |
| 2016/0008773 | A1* | 1/2016 | Yoneda ................... B32B 27/34 210/500.33 |
| 2016/0243503 | A1 | 8/2016 | Okabe et al. |

FOREIGN PATENT DOCUMENTS

| EP | 1958685 A1 | 8/2008 |
| JP | 63-54905 A | 3/1988 |
| JP | 2008-194672 A | 8/2008 |
| JP | 2010-240651 A | 10/2010 |
| JP | 2011-125856 A | 6/2011 |
| JP | 2011-529789 A | 12/2011 |
| WO | WO 97/34686 A1 | 9/1997 |
| WO | WO 2014/133130 A1 | 9/2014 |
| WO | WO 2014/133132 A1 | 9/2014 |
| WO | WO-2014133130 A1 * | 9/2014 ............... B32B 5/12 |
| WO | WO-2014133132 A1 * | 9/2014 ............ B01D 65/08 |
| WO | WO 2015/046582 A1 | 4/2015 |
| WO | WO-2015046582 A1 * | 4/2015 ............. B01D 71/82 |

OTHER PUBLICATIONS

International Search Report, issued in PCT/JP2016/081967, PCT/ISA/210, dated Jan. 24, 2017.
Written Opinion of the International Searching Authority, issued in PCT/JP2016/081967, PCT/ISA/237, dated Jan. 24, 2017.
Chinese Office Action and Search Report for Chinese Application No. 201680062986.2, dated Apr. 30, 2020, with English translation.
Chinese Office Action for Chinese Application No. 201680062986.2, dated Feb. 22, 2021, with English translation.

* cited by examiner

*Primary Examiner* — Taiwo Oladapo
(74) *Attorney, Agent, or Firm* — Birch, Stewart, Kolasch & Birch, LLP

(57) ABSTRACT

An object of the present invention is to provide a composite semipermeable membrane which has a high permeation rate and high salt removal performance and is excellent in terms of performance stability during long-term operation. The composite semipermeable membrane of the present invention includes: a supporting membrane including a substrate and a porous supporting layer; and a separation functional layer disposed on the porous supporting layer, the separation functional layer includes a crosslinked polyamide and a hydrophilic polymer having an acidic group, and in the separation functional layer, a ratio of (molar equivalent of amino groups)/(molar equivalent of amide groups) is 0.18 or less.

6 Claims, No Drawings

COMPOSITE SEMIPERMEABLE MEMBRANE AND METHOD FOR PRODUCING SAME

CROSS REFERENCE TO RELATED APPLICATIONS

This application is the National Phase of PCT/JP2016/081967 filed on Oct. 27, 2016, which claims priority under 35 U.S.C. § 119(a) to Patent Application No. 2015-211016 filed in Japan on Oct. 27, 2015, all of which are hereby expressly incorporated by reference into the present application.

TECHNICAL FIELD

The present invention relates to a composite semipermeable membrane useful for selective separation of a liquid mixture and a process for producing the composite semipermeable membrane. The composite semipermeable membrane obtained by the present invention has a high permeation rate and high salt removal performance and is excellent in terms of performance stability during long-term operation. This composite semipermeable membrane is suitable for use in, for example, desalination of brackish water.

BACKGROUND ART

With respect to separation of mixtures, there are various techniques for removing substances (e.g., salts) dissolved in a solvent (e.g., water). In recent years, however, membrane separation methods are coming to be utilized increasingly as processes for energy saving and resource saving. Examples of the membranes for use in the membrane separation methods include microfiltration membranes, ultrafiltration membranes, nanofiltration membranes, and reverse osmosis membranes. These membranes are used in the case of obtaining potable water, for example, from seawater, brackish water, or water containing a harmful substance, and for producing industrial ultrapure water, wastewater treatments, recovery of valuables, etc.

Most of the reverse osmosis membranes and nanofiltration membranes that are commercially available at present are composite semipermeable membranes, and there are two kinds: ones including a supporting membrane and, disposed thereover, a gel layer and an active layer formed by crosslinking a polymer; and ones including an active layer formed by condensation-polymerizing monomers on a supporting membrane. Among such composite semipermeable membranes, composite semipermeable membranes obtained by coating a surface of a supporting membrane with a separation functional layer including a crosslinked polyamide obtained by the polycondensation reaction of a polyfunctional amine with a polyfunctional acid halide are in extensive use as separation membranes having a high permeation rate and high selectively separating properties.

In fresh-water production plants employing reverse osmosis membranes, a higher permeation rate is desired for attaining a further reduction in running cost. Known methods for satisfying such requirement include: a method in which a composite semipermeable membrane including a crosslinked polyamide polymer as a separation functional layer is brought into contact with an aqueous solution containing nitrous acid (Patent Document 1); and a method in which the composite semipermeable membrane is brought into contact with an aqueous solution containing chlorine (Patent Document 2).

One of the problems arising in fresh-water production plants employing reverse osmosis membranes is a decrease in permeation rate (hereinafter often referred to as "fouling") due to membrane-fouling substances (hereinafter often referred to as "foulants") such as inorganic substances and organic substances. Having been proposed as methods for mitigating the fouling are: a method in which the surface of a separation functional layer is coated with poly(vinyl alcohol) to neutralize the charged state of the membrane surface to thereby reduce the interaction between the membrane surface and negatively charged foulants (Patent Document 3); a method in which after a crosslinked polyamide polymer is formed, the membrane surface is modified by a free-radical polymerization reaction using ultraviolet irradiation, etc. (Patent Document 4); a method in which after a crosslinked polyamide polymer is formed, a hydrophilic compound having an amino group is reacted with the remaining acid chloride to modify the membrane surface (Patent Documents 5 and 6); and a method in which a carboxy-containing hydrophilic compound is reacted with amino groups present on a membrane surface, thereby modifying the membrane surface (Patent Document 7).

BACKGROUND ART DOCUMENT

Patent Document

Patent Document 1: JP-A-2011-125856
Patent Document 2: JP-A-63-54905
Patent Document 3: WO 97/34686
Patent Document 4: JP-T-2011-529789
Patent Document 5: JP-A-2010-240651
Patent Document 6: U.S. Patent Application Publication No. 2012/0241373
Patent Document 7: WO 2015/046582

SUMMARY OF THE INVENTION

Problems that the Invention is to Solve

Thus, not only salt removal performance and permeation rate but also antifouling properties for long-term stable operation are required of reverse osmosis membranes. The membranes described in Patent Documents 1 and 2 can be made to have a heightened permeation rate but are low in antifouling property. Meanwhile, in Patent Document 3, the coating improves the antifouling properties but results in a decrease in permeation rate. In Patent Document 4, the polyamide of the reverse osmosis membrane suffers molecular-chain scission upon the ultraviolet irradiation and the membrane hence comes to have reduced salt removal performance. In Patent Documents 5 and 6, the membrane surface modification with a hydrophilic compound causes a decrease in salt removal performance. In Patent Document 7, the step for increasing the content of terminal amino groups in the membrane surface reduces the resistance to chemicals.

An object of the present invention is to provide a composite semipermeable membrane having a high permeation rate and high salt removal performance and having high antifouling properties, and to provide a process for producing the composite semipermeable membrane.

Means for Solving the Problems

In order to achieve the above-mentioned object, the present invention has the following configurations.

[1] A composite semipermeable membrane including: a supporting membrane including a substrate and a porous supporting layer; and a separation functional layer disposed on the porous supporting layer,
in which the separation functional layer include a crosslinked polyamide and a hydrophilic polymer having an acidic group, and
in the separation functional layer, a ratio of (molar equivalent of amino groups)/(molar equivalent of amide groups) is 0.18 or less.
[2] The composite semipermeable membrane according to [1], in which the ratio of (molar equivalent of amino groups)/(molar equivalent of amide groups) is 0.12 or less.
[3] The composite semipermeable membrane according to [1] or [2], in which the separation functional layer has a surface having a root-mean-square surface roughness of 50 nm or higher.
[4] The composite semipermeable membrane according to any one of [1] to [3], in which the crosslinked polyamide and the hydrophilic polymer are bonded to each other by amide bonds.
[5] A process for producing a composite semipermeable membrane including a substrate, a porous supporting layer formed on the substrate, and a separation functional layer formed on the porous supporting layer,
the process including performing the following steps (a), (b), and (c) in this order to thereby form the separation functional layer:
(a) a step in which an aqueous solution containing a polyfunctional amine and an organic solvent containing a polyfunctional acid halide are used to conduct interfacial polycondensation on a surface of a supporting membrane including the substrate and the porous supporting layer, thereby forming a crosslinked polyamide;
(b) a step in which a hydrophilic polymer is introduced onto the crosslinked polyamide obtained in the step (a), by amide bonds; and
(c) a step in which the crosslinked polyamide is brought into contact with a reagent for converting primary amino groups of the crosslinked polyamide into a functional group.
[6] The process for producing a composite semipermeable membrane according to [5], in which the step (b) is a step in which the crosslinked polyamide is brought into contact with both a reagent for converting a carboxy group into a carboxylic acid derivative and a solution containing a hydrophilic polymer having an acidic group.
[7] The process for producing a composite semipermeable membrane according to [5] or [6], in which the step (c) is a contact reaction in which the crosslinked polyamide is brought into contact with a reagent which reacts with a primary amino group to yield a diazonium salt or a derivative thereof.

Advantage of the Invention

According to the present invention, a composite semipermeable membrane having a high permeation rate and high salt removal performance and having high antifouling properties is obtained. Use of this membrane is expected to enable a fresh-water production plant or the like to be stably operated continuously over a long period.

MODE FOR CARRYING OUT THE INVENTION

1. Composite Semipermeable Membrane

The composite semipermeable membrane of the present invention includes: a supporting membrane including a substrate and a porous supporting layer; and a separation functional layer disposed on the porous supporting layer, the separation functional layer including a crosslinked polyamide (hereinafter often referred to simply as "polyamide") and a hydrophilic polymer having an acidic group. The separation functional layer has a ratio (molar equivalent of amino groups)/(molar equivalent of amide groups) of 0.18 or less, more preferably 0.12 or less.

In the composite semipermeable membrane of the present invention, it is preferable that the hydrophilic polymer is bonded to the crosslinked polyamide by amide bonds.

(1-1) Separation Functional Layer

The separation functional layer in the composite semipermeable membrane performs the function of separating solutes. Configurations of the separation functional layer, including composition and thickness, may be set in accordance with the intended use of the composite semipermeable membrane.

The separation functional layer specifically includes a crosslinked polyamide and a hydrophilic polymer having an acidic group. The crosslinked polyamide is obtained by the interfacial polycondensation of a polyfunctional amine with a polyfunctional acid halide. The hydrophilic polymer introduced into the separation functional layer is preferably bonded to the crosslinked polyamide by amide bonds.

The polyfunctional amine preferably includes at least one ingredient selected from among aromatic polyfunctional amines and aliphatic polyfunctional amines.

The aromatic polyfunctional amines are aromatic amines each having two or more amino groups in the molecule, and are not particularly limited. Examples thereof include m-phenylenediamine, p-phenylenediamine, 1,3,5-triaminobonzene, and N-alkylated derivatives of these amines. Examples of the N-alkylated derivatives include N,N-dimethyl-m-phenylenediamine, N,N-diethyl-m-phenylenediamine, N,N-dimethyl-p-phenylenediamine, and N,N-diethyl-p-phenylenediamine. Especially preferred from the standpoint of stably exhibiting the performances is m-phenylenediamine (hereinafter referred to as m-PDA) or 1,3,5-triaminobenzene.

The aliphatic polyfunctional amines are aliphatic amines each having two or more amino groups in the molecule, and preferably are piperazine-based amines and derivatives thereof. Examples thereof include piperazine, 2,5-dimethylpiperazine, 2-methylpiperazine, 2,6-dimethylpiperazine, 2,3,5-trimethylpiperazine, 2,5-diethylpiperazine, 2,3,5-triethylpiperazine, 2-n-propylpiperazine, 2,5-di-n-butylpiperazine, and ethylenediamine. Especially preferred from the standpoint of stably exhibiting the performances is piperazine or 2,5-dimethylpiperazine. One of these polyfunctional amines may be used alone, or a mixture of two or more thereof may be used.

The polyfunctional acid halide is an acid halide having two or more halogenocarbonyl groups in the molecule, and is not particularly limited so long as the acid halide reacts with the polyfunctional amine to yield a polyamide. As the polyfunctional acid halide, use can be made, for example, of halides of oxalic acid, malonic acid, maleic acid, fumaric acid, glutaric acid, 1,3,5-cyclohexanetricarboxylic acid, 1,3-cyclohexanedicarboxlic acid, 1,4-cyclohexanedicarboxylic acid, 1,3,5-benzenetricarboxylic acid, 1,2,4-benzenetricarboxylic acid, 1,3-benzenedicarboxlic acid, and 1,4-benzenedicarboxylic acid. Preferred of such acid halides are acid chlorides. Trimesoyl chloride (hereinafter referred to as TMC), which is an acid halide of 1,3,5-benenetricarboxylic acid, is preferred especially from the standpoints of profitability, availability, handleability, reactivity, etc. One of those polyfunctional acid halides may be used alone, or a mixture of two or more thereof may be used.

The polyamide has amide groups derived from the polymerization reaction of the polyfunctional amine with the polyfunctional acid halide and further has amino and carboxy groups derived from unreacted terminal functional groups. The amount of these functional groups affects the water permeability and salt removal ratio of the composite semipermeable membrane.

According to Tsuyoshi Matsuura, Goseimaku No Kiso, Kitamishobo, p. 9, 1981, a reverse osmosis membrane most suitable for a given application can be designed by selecting the kind, amount, positions, etc. of ionic groups (functional groups) in imparting the performances to the membrane. For improving the performances of a crosslinked-polyamide membrane, it is effective to cause phenolic hydroxyl groups, which are hydrophilic groups, to be present besides the carboxy and amino groups that are components of the main chain. Also effective is to apply a technique for developing a pigment (dye), as a means of improving the durability of the polyamide, and cause azo groups, which are highly effective in improving fastness, to be present simultaneously with those groups.

The functional groups shown above can be introduced also by converting amino groups present in the crosslinked polyamide into phenolic hydroxyl groups or azo groups by a suitably selected chemical reaction. For example, the amino groups can be converted to phenolic hydroxyl groups by using dinitrogen tetroxide, nitrous acid, nitric acid, sodium hydrogen sulfite, sodium hypochlorite, or the like as a reagent. Meanwhile, the amino groups can be converted to azo groups, for example, by an azo coupling reaction via a diazonium salt or by reacting the amino groups with a nitroso compound.

In the composite semipermeable membrane in which the crosslinked polyamide has carboxy groups, amino groups, phenolic hydroxyl groups, and azo groups therein, the inclusion of carboxy, amino, and phenolic hydroxyl groups, which are hydrophilic functional groups, increases the permeation rate to improve the membrane performances and the inclusion of azo groups enhances the durability of the membrane. Meanwhile, the permeation rate decreases as the content of azo groups increases. In addition, the amino groups generally are readily oxidized with an oxidizing agent such as chlorine or hypochlorous acid.

In view of these, both high membrane performances and high durability can be attained by reducing the content of amino groups and increasing the content of azo groups, and preferably by increasing the content of phenolic hydroxyl groups.

The contents of these functional groups in the polyamide can be determined, for example, by $^{13}C$ solid NMR spectroscopy. Specifically, the substrate is peeled from the composite semipermeable membrane to obtain the separation functional layer and the porous supporting layer. Thereafter, the porous supporting layer is dissolved away to obtain the separation functional layer. The separation functional layer obtained is examined by DD/MAS-$^{13}C$ solid NMR spectroscopy, and the integral of a peak assigned to the carbon atom having each functional group bonded thereto is calculated. The content of each functional group can be determined from the integral.

The functional-group ratio "(molar equivalent of amino groups)/(molar equivalent of amide groups)" in the separation functional layer relates to the durability of the composite semipermeable membrane, and is simply called "amino group proportion".

In the separation functional layer in the present invention, the amino group proportion is 0.18 or less, preferably 0.12 or less. Since the ratio of (molar equivalent of amino groups)/(molar equivalent of amide groups) is 0.18 or less, the interaction to be exerted on the polyamide separation functional layer is weakened and a higher permeation rate is attained.

There is no particular lower limit on the amino group proportion, but a lower limit thereof may be, for example, 0.10.

Introduction of azo groups into the polyamide separation functional layer is preferred because this introduction improves the salt removal ratio. It is preferred to introduce azo groups so that the ratio of (molar equivalent of azo groups)/(molar equivalent of amide groups) in the polyamide is 0.1 or higher but less than 1.0. In cases when the ratio is 0.1 or higher but less than 1.0, a high salt removal ratio can be obtained.

It is preferable in the present invention that the hydrophilic polymer is introduced onto the polyamide layer by amide bonds. The term "hydrophilic polymer" in the present invention means a polymer which dissolves, in an amount of 0.5 g or larger, in 1 L of water under the conditions of 25° C.

Specifically, the hydrophilic polymer, in many cases, is bonded to the polyamide, which is a main component of the separation functional layer, by amide bonds via terminal amino groups of the polyamide. More specifically, the hydrophilic polymer is preferably disposed on a surface of the separation functional layer (in other words, on the surface of the layer constituted of the polyamide). As will be described later, by forming a polyamide and thereafter introducing a hydrophilic polymer, the hydrophilic polymer is disposed on the surface of the portion in the separation functional layer which is constituted of the polyamide. This is because the hydrophilic polymer is thought not to substantially pass through the polyamide layer, which substantially performs the separating function. That the hydrophilic polymer is present in a large amount in the surface of the separation functional layer can be ascertained by repeating a series of examination operations including detecting the hydrophilic polymer on the surface of the separation functional layer, thereafter etching the surface, and further detecting the hydrophilic polymer. Namely, the separation functional layer can be regarded as including a layer of a crosslinked polyamide and a layer of a hydrophilic polymer disposed thereon.

In cases when the hydrophilic polymer is introduced into the separation functional layer by amide bonds, the separation membrane can exhibit high antifouling properties. In case where the hydrophilic polymer is introduced by weak bonds or an interaction, this hydrophilic polymer may be readily removed by washing with a chemical, etc. The term "antifouling properties" herein can mean both the property of being inhibited from suffering fouling and the property of undergoing a limited decrease in performance after fouling has occurred. The reasons why the antifouling properties are obtained due to the hydrophilic polymer are thought to be as follows.

The hydrophilic polymer, owing to the mobility thereof, can inhibit fouling substances from adhering to the separation functional layer. The fouling inhibition by the mobility is effective against any of nonionic, cationic, and anionic fouling substances. Since the hydrophilic polymer is present in the surface of the separation functional layer, fouling substances are more apt to adhere to the hydrophilic polymer than to the polyamide. Namely, even if fouling substances adhere to the surface of the separation functional layer, the fouling substances which have adhered are thought to be located apart from the polyamide. Consequently, the separation membrane is inhibited from decreasing in performance.

It is preferable that the hydrophilic polymer should contain an acidic group, especially from the standpoints of the effect of improving solubility in water and the effect of diminishing the adhesion of negatively charged foulants.

Preferred acidic groups are a carboxy group, a phosphono group, a phosphate group, and a sulfo group. One of these acidic groups may be contained alone in the hydrophilic polymer, or two or more thereof may be contained. With respect to the structures of these acidic groups, the acidic groups may be present in the form of any of the acid form, ester compound, anhydride, and metal salt.

Such hydrophilic polymers preferably are polymers of monomers having an ethylenically unsaturated group, from the standpoint of the chemical stability of the polymers. The monomers having an ethylenically unsaturated group each can contain two or more acidic groups, but preferably are monomers having one or two acidic groups, from the standpoint of the availability of the monomers.

Examples of monomers having a carboxy group, among the monomers having an ethylenically unsaturated group, include maleic acid, maleic anhydride, acrylic acid, methacrylic acid, 2-(hydroxymethyl)acrylic acid, 4-(meth)acryloyloxyethyltrimellitic acid and the corresponding anhydride, 10-methacryloyloxydecylmalonic acid, N-(2-hydroxy-3-methacryloyloxypropyl)-N-phenylglycine, and 4-vinylbenzoic acid. Acrylic acid, methacrylic acid, and maleic acid are preferred of these from the standpoints of suitability for general uses, copolymerizability, etc.

Examples of monomers having a phosphono group, among the monomers having an ethylenically unsaturated group, include vinylphosphonic acid, 4-vinylphenylphosphonic acid, 4-vinylbenzylphosphonic acid, 2-methacryloyloxyethylphosphonic acid, 2-methacrylamidoethylphosphonic acid, 4-methacrylamido-4-methylphenylphosphonic acid, 2-[4-(dihydroxyphosphoryl)-2-oxabutyl]acrylic acid, and 2,4,6-trimethylphenyl 2-[2-(dihydroxyphosphoryl) ethoxymethyl]acrylate.

Examples of monomers having a phosphate group, among the monomers having an ethylenically unsaturated group, include 2-methacryloyloxypropyl monohydrogen phosphate, 2-methacryloyloxypropyl dihydrogen phosphate, 2-methacryloyloxyethyl monohydrogen phosphate, 2-methacryloyloxyethyl dihydrogen phosphate, 2-methacryloyloxyethyl phenyl hydrogen phosphate, dipentaerythritol pentamethacryloyloxyphosphate, 10-methacryloyloxydecyl dihydrogen phosphate, dipentaerythritol pentamethacryloyloxyphosphate, mono(1-acryloylpiperidin-4-yl) phosphate, 6-(methacrylamido)hexyl dihydrogen phosphate, and 1,3-bis(N-acryloyl-N-propylamino)propan-2-yl dihydrogen phosphate.

Examples of monomers having a sulfo group, among the monomers having an ethylenically unsaturated group, include vinylsulfonic acid, 4-vinylphenylsulfonic acid, and 3-(methacrylamido)propylsulfonic acid.

The hydrophilic polymer to be used in the present invention preferably has a weight-average molecular weight of 2,000 or higher. The introduction of the hydrophilic polymer into the surface of the polyamide separation functional layer is thought to be effective in inhibiting foulants from adhering to the membrane surface, by the mobility of the hydrophilic polymer. The weight-average molecular weight of the hydrophilic polymer is more preferably 5,000 or higher, even more preferably 100,000 or higher. Although there is no particular upper limit on the weight-average molecular weight of the hydrophilic polymer, the weight-average molecular weight thereof may be, for example, 1,000,000 or less.

The hydrophilic polymer may be a homopolymer of any of the monomers having an ethylenically unsaturated group, or may be a copolymer of two or more monomers in accordance with purposes. Examples of the copolymer ingredients include polyvinylpyrrolidone, poly(vinyl alcohol), poly(vinyl acetate), poly(ethylene glycol), poly(propylene glycol), polyethylenimine, polyvinylamine, polyallylamine, and block, graft, or random copolymers of any of these hydrophilic polymers with a hydrophobic polymer. Polyvinylpyrrolidone, poly(vinyl alcohol), and poly(vinyl acetate) are preferred of these hydrophilic polymers from the standpoints of ease of copolymerization and reduced susceptibility to foulant adhesion.

In the hydrophilic polymer, the proportion of monomer unit structures containing an acidic group is preferably 5-100 mol %. Namely, the ratio of (number of moles of monomer(s) having an acidic group)/(number of moles of the monomer(s) constituting the hydrophilic polymer) (copolymerization ratio) in the monomer(s) constituting the hydrophilic polymer is preferably from 5% (0.05) to 100% (1.0). In cases when the proportion of monomer units containing an acidic group in the hydrophilic polymer is 5 mol % or higher, this hydrophilic polymer is sufficiently bonded to the polyamide and, hence, foulant adhesion to the membrane surface is inhibited by the mobility of the hydrophilic polymer. The proportion of structures containing an acidic group is more preferably 10-100 mol %, even more preferably 40-100 mol %.

The surface of the separation functional layer in the state of including the hydrophilic polymer bonded therein preferably has a root-mean-square surface roughness (hereinafter referred to also as Rms) of 50 nm or higher. In cases when the root-mean-square surface roughness thereof is 50 nm or higher, this separation functional layer has an increased surface area, resulting in an increase in permeation rate. The root-mean-square surface roughness thereof may be 80 nm or higher. Although there is no particular upper limit on the root-mean-square surface roughness thereof, the root-mean-square surface roughness thereof may be, for example, 100 nm or less, or may be 90 nm or less, or 86 nm or less.

The root-mean-square surface roughness can be determined with an atomic force microscope (hereinafter often referred to as AFM). The root-mean-square surface roughness is the square root of an average of the squares of deviations of distance from a reference plane to a specified surface. The term "measurement surface" means a surface indicated by all the measurement data; the term "specified surface means a specific portion of the measurement surface for which roughness is to be determined and which has been specified by a clip; and the term "reference plane" means a plane which has a height Z represented by $Z=Z0$, where $Z0$ is an average height of the specified surface. As the AFM, use can be made, for example, of NanoScope Ma, manufactured by Digital Instruments.

The root-mean-square surface roughness of the surface of the separation functional layer can be controlled by regulating monomer concentrations and temperature when the separation functional layer is formed by interfacial polycondensation. For example, a low temperature during the interfacial polycondensation results in a lower root-mean-square surface roughness, while a high temperature results in a higher root-mean-square surface roughness. In the case where the surface of a separation functional layer is modified with a hydrophilic polymer, a large thickness of the hydrophilic-polymer layer results in a lower root-mean-square surface roughness. It is hence preferred to conduct the modification so as to result in a root-mean-square surface roughness of 50 nm or higher.

The thickness of the separation functional layer is usually preferably in the range of 0.01 μm to 1 μm, more preferably in the range of 0.1 μm to 0.5 μm, from the standpoint of obtaining sufficient separation performance and a sufficient permeation rate.

The thickness of the hydrophilic-polymer layer is usually preferably in the range of 1 nm to 30 nm, more preferably in the range of 2 nm to 10 nm, from the standpoints of attaining inhibition of foulant adhesion to the membrane surface and obtaining durability. In cases when the thickness of the hydrophilic-polymer layer is 1 nm or larger, the effect of inhibiting foulants from adhering to the membrane surface is sufficiently obtained.

(1-2) Supporting Membrane

The supporting membrane serves to impart strength to the separation functional layer, and the supporting membrane itself has substantially no separating performance concerning separation of ions and the like. The supporting membrane includes a substrate and a porous supporting layer.

The porous supporting layer is not particularly limited in the size or distribution of pores thereof. For example, preferred is a supporting membrane including a porous supporting layer which has even fine pores or has fine pores that gradually increase in size from the surface thereof on the side where the separation functional layer is to be formed to the surface thereof on the other side and in which the size of the fine pores as measured in the surface on the side where the separation functional layer is to be formed is 0.1 nm to 100 nm.

The supporting membrane can be obtained, for example, by pouring a polymer on a substrate to thereby form a porous supporting layer on the substrate. There are no particular limitations on the materials to be used for the supporting membrane or on the shape thereof.

Examples of the substrate includes fabric constituted of at least one polymer selected from among polyesters and aromatic polyamides. It is especially preferred to use polyesters which are highly stable mechanically and thermally.

As the fabric for use as the substrate, it is preferred to use long-fiber nonwoven fabric or short-fiber nonwoven fabric. The substrate is required to have excellent suitability for membrane formation so as to avoid the following troubles: when a polymer solution is poured onto a substrate, the solution infiltrates thereinto excessively to reach the back surface; the porous supporting layer peels off the substrate; and the membrane has defects, such as unevenness or pinholes, due to the fluffing, etc. of a substrate. Consequently, use of long-fiber nonwoven fabric is more preferred.

Examples of the long-fiber nonwoven fabric include long-fiber nonwoven fabric configured of thermoplastic continuous filaments. In cases when the substrate is constituted of long-fiber nonwoven fabric, it is possible to inhibit unevenness and membrane defects from occurring due to fiber fluffing during the pouring of a polymer solution as in the case of using short-fiber nonwoven fabric. Furthermore, since tension is applied in the direction of substrate formation in the step of continuously producing the composite semipermeable membrane, it is preferable that long-fiber nonwoven fabric having excellent dimensional stability should be used as the substrate.

In particular, in cases when the fibers of the substrate which are disposed in the surface on the side opposite from the porous supporting layer are longitudinally oriented with respect to the direction of membrane formation, this substrate can retain strength and be prevented from suffering membrane breakage, etc. This substrate is hence preferred. The term "longitudinal orientation" herein means that the orientation direction of the fibers is parallel with the direction of membrane formation. In the reverse case in which the orientation direction of the fibers is perpendicular to the direction of membrane formation, this fiber orientation is referred to as transverse orientation.

The degree of fiber orientation of the nonwoven-fabric substrate may be as follows. The degree of orientation of the fibers in the surface on the side opposite from the porous supporting layer is preferably 0°-25°. The degree of fiber orientation is an index which indicates the directions of the fibers of the nonwoven-fabric substrate constituting the supporting membrane, and that term means an average angle of the fibers constituting the nonwoven-fabric substrate in cases when the direction of membrane formation in continuous membrane formation is taken as 0° and the direction perpendicular to the membrane formation direction, i.e., the width direction of the nonwoven-fabric substrate, is taken as 90°. Consequently, the closer the degree of fiber orientation to 0°, the more the fibers are longitudinally oriented, while the closer the degree of fiber orientation to 90°, the more the fibers are transversely oriented.

Although the steps for producing the composite semipermeable membrane or the steps for producing an element include a heating step, a phenomenon occurs in which the supporting membrane or the composite semipermeable membrane shrinks due to the heating. Especially in continuous membrane formation, the membrane is prone to shrink more along the width direction, in which no tension is being applied. Since the shrinkage of the supporting membrane or composite semipermeable membrane poses problems concerning dimensional stability, etc., substrates having a low degree of thermal dimensional change are desirable.

In cases when the nonwoven-fabric substrate is one in which the difference in the degree of orientation between the fibers disposed in the surface on the side opposite from the porous supporting layer and the fibers disposed in the surface facing the porous supporting layer is 10°-90°, this substrate is effective in reducing width-direction changes due to heat and is hence preferred.

The substrate has an air permeability of preferably 2.0 $cc/cm^2/sec$ or higher.

In cases when the air permeability thereof is within that range, the composite semipermeable membrane has an increased permeation rate. The reason for this is thought to be as follows. In the step of forming a supporting membrane, when the substrate on which a polymer has been poured is immersed in a coagulating bath, non-solvent displacement from the substrate side proceeds at an increased rate to give a porous supporting layer having a changed internal structure. This internal structure affects monomer retention amount and diffusion rate in the subsequent step of forming a separation functional layer, thereby producing the effect shown above.

Air permeability can be measured with a Frazir type tester in accordance with JIS L1096 (2010). For example, a piece having a size of 200 mm×200 mm is cut out from the substrate to obtain a sample. This sample is set in the Frazir type tester, and the suction fan and the air port are regulated so that the inclined barometer reads a pressure of 125 Pa. The amount of air which passes through the substrate, i.e., air permeability, can be calculated from the pressure indicated by the vertical barometer and the kind of the air port used. As the Frazir type tester, use can be made, for example, of KES-F8-AP1, manufactured by Kato Tech Co., Ltd.

The thickness of the substrate is preferably in the range of 10 μm to 200 μm, more preferably in the range of 30 μm to 120 μm.

Usable as materials for the porous supporting layer are homopolymers and copolymers such as polysulfones, polyethersulfones, polyamides, polyesters, cellulosic polymers, vinyl polymers, poly(phenylene sulfide), poly(phenylene sulfide sulfone)s, poly(phenylene sulfone), and poly(phenylene oxide). These polymers can be used alone or as a blend thereof. Usable as the cellulosic polymers are cellulose acetate, cellulose nitrate, and the like. Usable as the vinyl polymers are polyethylene, polypropylene, poly(vinyl chloride), polyacrylonitrile, and the like. Preferred of these are homopolymers and copolymers such as polysulfones, polyamides, polyesters, cellulose acetate, cellulose nitrate, poly(vinyl chloride), polyacrylonitrile, poly(phenylene sulfide), and poly(phenylene sulfide sulfone)s. More preferred examples include cellulose acetate, polysulfones, poly(phenylene sulfide sulfone)s, and poly(phenylene sulfone). Of these materials, polysulfones can be generally used advantageously since this material is highly stable chemically, mechanically, and thermally and is easy to mold.

Specifically, a polysulfone made up of repeating units represented by the following chemical formula is preferred because use of this polysulfone renders pore diameter control of the supporting membrane easy and this supporting membrane has high dimensional stability.

[Chem. 1]

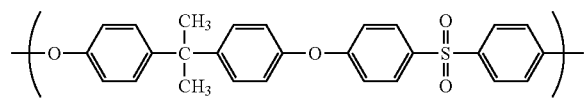

For example, an N,N-dimethylformamide (hereinafter referred to as DMF) solution of the polysulfone is cast in a certain thickness on densely woven polyester fabric or nonwoven polyester fabric, and the solution cast is coagulated by a wet process in water. Thus, a supporting membrane can be obtained in which most of the surface has fine pores with a diameter of several tens of nanometers or less.

The thickness of the supporting membrane affects the strength of the composite semipermeable membrane to be obtained and the packing density in an element fabricated using the composite semipermeable membrane. From the standpoint of obtaining sufficient mechanical strength and sufficient packing density, the thickness of the supporting membrane is preferably in the range of 30 μm to 300 μm, more preferably in the range of 100 μm to 220 μm.

The morphology of the porous supporting layer can be examined with a scanning electron microscope, transmission electron microscope, or atomic force microscope. For example, in the case of an examination with a scanning electron microscope, the porous supporting layer is peeled from the substrate and thereafter fractured by freeze fracturing to obtain a sample for cross-section examination. This sample is thinly coated with platinum, platinum-palladium, or ruthenium tetrachloride, preferably with ruthenium tetrachloride, and is examined with a high-resolution field emission scanning electron microscope (UHR-FE-SEM) at an accelerating voltage of 3-15 kV. As the high-resolution field emission scanning electron microscope, use can be made, for example, of electron microscope Type S-900, manufactured by Hitachi Ltd.

The supporting membrane to be used in the invention can be selected from various commercial materials such as "Millipore Filter VSWP" (trade name), manufactured by Millipore Corp., and "Ultra Filter UK10" (trade name), manufactured by Toyo Roshi Ltd. The supporting membrane can be produced, for example, by the method described in Office of Saline Water Research and Development Progress Report, No. 359 (1968).

The thickness of the porous supporting layer is preferably in the range of 20 μm to 100 μm. In cases when the thickness of the porous supporting layer is 20 μm or larger, satisfactory pressure resistance is obtained and an even supporting membrane having no defects can be obtained. The composite semipermeable membrane equipped with such a porous supporting layer can hence exhibit satisfactory salt removal performance. In case where the thickness of the porous supporting layer exceeds 100 μm, unreacted substances remain in an increased amount after the production and this may result in a decrease in permeation rate and a decrease in chemical resistance.

The thickness of the substrate and the thickness of the composite semipermeable membrane can be measured with a digital thickness gauge. Since the separation functional layer is extremely thin as compared with the supporting membrane, the thickness of the composite semipermeable membrane can be regarded as the thickness of the supporting membrane. Consequently, the thickness of the porous supporting layer can be easily calculated by measuring the thickness of the composite semipermeable membrane with a digital thickness gauge and subtracting the thickness of the substrate from the thickness of the composite semipermeable membrane. As the digital thickness gauge, use can be made, for example, of PEACOCK, manufactured by Ozaki MFG. Co., Ltd. In the case of using a digital thickness gauge, a thickness measurement is made with respect to twenty portions and an average value is calculated.

In the case where the thickness of the substrate or the thickness of the composite semipermeable membrane is difficult to measure with a thickness gauge, the thickness thereof may be determined with a scanning electron microscope. A thickness measurement is made on electron photomicrographs of cross-sections of arbitrarily selected five portions in a sample, and an average thereof is calculated to thereby determine the thickness.

2. Production Process

A process for producing the composite semipermeable membrane is explained next. The process includes a step for forming a supporting membrane and a step for forming a separation functional layer.

(2-1) Step for Forming Supporting Membrane

The step for forming a supporting membrane includes: a step in which a polymer solution is applied to a substrate; and a step in which the substrate to which the polymer solution has been applied is immersed in a coagulating bath to coagulate the polymer. Thus, a porous supporting layer is formed on the substrate.

In the step for applying a polymer solution to a substrate, a polymer which is the component of the porous supporting layer is dissolved in a good solvent for the polymer, thereby preparing the polymer solution.

In the case of using a polysulfone as the polymer, the temperature of the polymer solution at the time of application of the polymer solution is preferably 10-60° C. In cases when the temperature of the polymer solution is within that range, the polymer solution sufficiently infiltrates into interstices among the fibers of the substrate and is then solidified without suffering polymer precipitation. As a result, the porous supporting layer is tenaciously bonded to the substrate by the anchoring effect, and a satisfactory supporting membrane can be obtained. The preferred range of the temperature of the polymer solution can be suitably regulated in accordance with the kind of the polymer used, desired solution viscosity, etc.

The time period from application of the polymer solution to the substrate to immersion in a coagulating bath is preferably 0.1-5 seconds. In cases when the time period to immersion in a coagulating bath is within that range, the polymer-containing organic solvent sufficiently infiltrates into interstices among the fibers of the substrate before being solidified. The preferred range of the time period to immersion in a coagulating bath can be suitably regulated in accordance with the kind of the polymer solution used, desired solution viscosity, etc.

Water is usually used as the coagulating bath. However, any coagulating bath in which the polymer, which is the component of the porous support layer, does not dissolve may be used. The membrane morphology of the supporting membrane to be obtained changes depending on the composition of the coagulating bath, and the composite semipermeable membrane to be obtained changes accordingly. The temperature of the coagulating bath is preferably −20° C. to 100° C., more preferably 10-50° C. In cases when the temperature of the coagulating bath is within that range, this coagulating bath does not suffer severe surface vibrations due to thermal movement, and the membrane thus formed retains surface smoothness. In addition, in cases when the temperature thereof is within that range, an appropriate coagulation rate and a satisfactory membrane formation efficiency are obtained.

The supporting membrane thus obtained is then washed with hot water in order to remove the solvent remaining in the membrane. The temperature of this hot water is preferably 40-100° C., more preferably 60-95° C. In cases when the temperature thereof is within that range, the supporting membrane does not shrink to a high degree and brings about a satisfactory permeation rate. In addition, in cases when the temperature of the hot water is within that range, a sufficient washing effect is obtained.

(2-2) Step for Forming Separation Functional Layer

Next, the step for forming a separation functional layer, which is a component of the composite semipermeable membrane, is explained. The separation functional layer is formed on the porous supporting layer included in the supporting membrane. The separation functional layer is formed by performing the following steps (a), (b), and (c) in this order:

(a) a step in which an aqueous solution containing a polyfunctional amine and an organic solvent containing a polyfunctional acid halide are used to conduct interfacial polycondensation on a surface of a supporting membrane including the substrate and the porous supporting layer, thereby forming a crosslinked polyamide;

(b) a step in which a hydrophilic polymer is introduced onto the crosslinked polyamide obtained in the step (a), by amide bonds; and (c) a step in which the crosslinked polyamide is brought into contact with a reagent for converting primary amino groups of the crosslinked polyamide into a functional group.

Step (b) is a step in which a hydrophilic polymer is introduced to amino groups of the crosslinked polyamide by amide bonds. Meanwhile, step (c) is a step in which amino groups are converted to a functional group. By performing step (c) after step (b), the hydrophilic polymer can be introduced in a larger amount than in the case of performing step (c) before step (b), and an improvement in antifouling property can be attained.

The steps (a), (b), and (c), in the case of performing these steps in that order, are explained below.

In step (a), the organic solvent for dissolving a polyfunctional acid halide therein may be any organic solvent which is immiscible with water and which neither damages the supporting membrane nor inhibits the reaction for yielding a crosslinked polyamide. Representative examples thereof include liquid hydrocarbons and halogenated hydrocarbons such as trichlorotrifluoroethane. From the standpoints of freedom from ozone layer depletion, availability, handleability, and safety during handling, it is preferred to use one of or a mixture of two or more of octane, nonane, decane, undecane, dodecane, tridecane, tetradecane, heptadecane, hexadecane, cyclooctane, ethylcyclohexane, 1-octene, 1-decene, and the like.

The aqueous solution of a polyfunctional amine and the organic solvent containing a polyfunctional acid halide may contain compounds such as an acylation catalyst, polar solvent, acid scavenger, surfactant, and antioxidant according to need, so long as these compounds do not inhibit the reaction between the two ingredients.

In order to conduct the interfacial polycondensation on a surface of the supporting membrane, the surface of the supporting membrane is first coated with the aqueous solution of a polyfunctional amine. The concentration of this aqueous solution containing a polyfunctional amine is preferably 0.1-20% by weight, more preferably 0.5-15% by weight.

For coating the surface of the supporting membrane with the aqueous solution of a polyfunctional amine, any method may be used so long as the surface of the supporting membrane is evenly and continuously coated with the aqueous solution. Use may be made of a known coating technique such as, for example, a method in which the aqueous solution is applied to the surface of the supporting membrane or a method in which the supporting membrane is immersed in the aqueous solution. The period during which the supporting membrane is in contact with the aqueous polyfunctional-amine solution is preferably in the range of 5 seconds to 10 minutes, more preferably in the range of 10 seconds to 3 minutes. It is preferred to subsequently remove the excessively applied aqueous solution in an excess solution removal step. Examples of methods for removing the excess solution include a method in which the supporting membrane is held vertically to make the excess aqueous solution flow down naturally. After the removal of the excess solution, the membrane surface may be dried to remove some or all of the water contained in the aqueous solution.

Thereafter, an organic solvent containing the polyfunctional acid halide is applied to the supporting membrane which has been coated with the aqueous polyfunctional-amine solution, and a crosslinked polyamide is formed by interfacial polycondensation. The period during which the interfacial polycondensation is performed is preferably 0.1 second to 3 minutes, more preferably 0.1 second to 1 minute.

The concentration of the polyfunctional acid halide in the organic solvent is not particularly limited. However, in case where the concentration thereof is too low, there is a possibility that the formation of a polyamide as an active layer might be insufficient, resulting in defects. Meanwhile, too high concentrations thereof are disadvantageous from the standpoint of coat. Consequently, the concentration of the polyfunctional acid halide is preferably about 0.01-1.0% by weight.

After the reaction, it is preferred to subsequently remove some of the organic solvent in an excess solvent removal step. For removing some of the organic solvent, use can be made, for example, of a method in which the membrane is held vertically to make the excess organic solvent flow down naturally, thereby removing the excess organic solvent. In this case, the period during which the membrane is held vertically is preferably 1-5 minutes, more preferably 1-3 minutes. In cases when the holding period is 1 minute or longer, a polyamide having the desired function is easy to obtain. In cases when the holding period is 5 minutes or less, more preferably 3 minutes or less, the occurrence of defects due to excessive removal of the organic solvent can be inhibited and a decrease in performance can hence be inhibited.

The polyamide obtained by the method described above is washed with hot water at a temperature in the range of 25-90° C. for 1-60 minutes. Thus, the solute rejection performance and permeation rate of the composite semipermeable membrane can be further improved. However, in case where the hot water has too high a temperature and the polyamide is rapidly cooled after the hot-water washing, the composite semipermeable membrane comes to have reduced chemical resistance. It is therefore preferred to conduct the hot-water washing at a temperature in the range of 25-60° C. In the case of conducting the hot-water washing at a high temperature exceeding 60° C. but not higher than 90° C., it is preferred to gradually cool the polyamide after the hot-water washing. For example, there is a method in which the polyamide is cooled to room temperature by bringing the polyamide into contact with hot water so that the water temperature becomes lower in stages.

In the step of hot-water washing, the hot water may contain an acid or an alcohol. The inclusion of an acid or an alcohol facilitates control of the formation of hydrogen bonds in the polyamide. Examples of the acid include inorganic acids such as hydrochloric acid, sulfuric acid, and phosphoric acid and organic acids such as citric acid and oxalic acid. It is preferred to regulate the concentration of the acid so as to result in a pH of 2 or less. The pH is more preferably 1 or less. Examples of the alcohol include monohydric alcohols such as methyl alcohol, ethyl alcohol, and isopropyl alcohol and polyhydric alcohols such as ethylene glycol and glycerin. The concentration of the alcohol is preferably 10-100% by weight, more preferably 10-50% by weight.

Next, step (b) is conducted, in which a hydrophilic polymer is introduced onto the crosslinked polyamide by amide bonds. A method suitable for this step is to bring an aqueous solution containing both the hydrophilic polymer and a condensing agent into contact with the polyamide layer. That is, it is preferable that a solution containing both a reagent (condensing agent) for converting carboxy groups into a carboxylic acid derivative and a hydrophilic polymer having an acidic group should be brought into contact with the polyamide layer. In particular, it is preferable that the surface of the polyamide layer should come into contact with the aqueous solution containing both a hydrophilic polymer and a condensing agent. Functional groups of the polyamide layer (functional groups in the surface of the polyamide layer) undergo a condensation reaction with activated functional groups contained in the hydrophilic polymer to form amide bonds, whereby the hydrophilic polymer is introduced. Methods for bringing the aqueous solution containing a hydrophilic polymer and a condensing agent into contact with the separation functional layer are not particularly limited. For example, the whole composite semipermeable membrane may be immersed in the aqueous solution containing a hydrophilic polymer and a condensing agent, or the aqueous solution containing a hydrophilic polymer and a condensing agent may be sprayed on the surface of the composite semipermeable membrane. Methods for the contact are not limited so long as the polyamide comes into contact with the hydrophilic polymer and the condensing agent.

One hydrophilic polymer may be brought into contact with the polyamide layer, or a mixture of two or more hydrophilic polymers may be brought into contact with the polyamide layer. It is preferred to use the hydrophilic polymer(s) in the form of an aqueous solution having a concentration of 10 ppm to 1% by weight. In cases when the concentration of the hydrophilic polymer(s) is 10 ppm or higher, the hydrophilic polymer(s) can be sufficiently reacted with functional groups present in the polyamide. Meanwhile, in case where the concentration thereof exceeds 1%, a hydrophilic-polymer layer having a larger thickness may be formed, resulting in a decrease in permeation rate.

Other compounds may be incorporated into the aqueous solution of a hydrophilic polymer. For example, an alkaline metal compound, such as sodium carbonate, sodium hydroxide, or sodium phosphate, may be added in order to accelerate the reaction between the polyamide layer and the hydrophilic polymer. It is also preferred to add a surfactant such as sodium dodecyl sulfate or sodium benzenesulfonate in order to remove substances remaining in the polyamide, such as the water-immiscible organic solvent, monomers including the polyfunctional acid halide and polyfunctional amine compound, and oligomers yielded by the reaction of these monomers.

The term "condensing agent" in the invention means a compound which, in water, activates carboxy groups to cause the condensation reaction with amino groups of the polyamide to proceed. Examples of such compound include 1-ethyl-3-(3-dimethylaminopropyl)carbodiimide hydrochloride, 1,3-bis(2,2-dimethyl-1,3-dioxolan-4-ylmethyl)carbodiimide, and 4-(4,6-dimethoxy-1,3,5-triazin-2-yl)-4-methylmorpholinium chloride (hereinafter referred to as DMT-MM). Of these compounds, DMT-MM is especially preferred from the standpoints of stability during the condensation reaction, the low toxicity of by-products of the condensation reaction, etc.

The concentration of the condensing agent in the aqueous solution containing both the hydrophilic polymer and the condensing agent is not particularly limited so long as the concentration thereof is higher than the concentration of the carboxy groups to be activated. The condensing agent contained in such a concentration can produce a sufficient effect on the condensation with the reactive groups.

The aqueous solution containing both the hydrophilic polymer and the condensing agent preferably has a pH of 2-6. In case where the pH thereof exceeds 6, negative charges generated by the dissociation of carboxy groups may reduce the frequency of contact between the polyamide and the hydrophilic polymer, resulting in a decrease in the efficiency of the condensation reaction. Meanwhile, use of the aqueous solution having a pH less than 2 may result in a deterioration due to the acid and hence in a decrease in the salt removal performance of the composite semipermeable membrane.

The thickness of the layer of the hydrophilic polymer introduced is preferably 1 nm to 30 nm. In cases when the thickness of the layer of the hydrophilic polymer is 1 nm or larger, the completed separation membrane can acquire sufficient antifouling properties. In cases when the thickness of the layer of the hydrophilic polymer is 30 nm or less, the conversion of primary amino groups into a functional group in the subsequent step proceeds sufficiently and, hence, the completed separation membrane can acquire high durability.

The surface of the crosslinked-polyamide layer onto which the hydrophilic polymer has been introduced (i.e., the surface of the separation functional layer) preferably has a root-mean-square surface roughness of 50 nm or higher. In cases when the root-mean-square surface roughness thereof is 50 nm or higher, the conversion of primary amino groups into a functional group in the subsequent step proceeds sufficiently and, hence, the completed separation membrane can acquire high durability.

Next, step (c) is conducted, in which the washed polyamide which has undergone step (b) is brought into contact with a reagent for converting primary amino groups of the crosslinked polyamide into a functional group. It is especially preferred to conduct the conversion into a functional group by a contact reaction in which the polyamide is brought into contact with a reagent that reacts with primary amino groups to yield a diazonium salt or a derivative thereof. Examples of the reagent that reacts with primary amino groups to yield a diazonium salt or a derivative thereof include aqueous solutions of nitrous acid, salts thereof, nitrosyl compounds, etc. Aqueous solutions of nitrous acid or of nitrosyl compounds have the property of decomposing with gas evolution. It is hence preferred to gradually yield nitrous acid by reacting a nitrous acid salt with an acidic solution. Nitrous acid salts generally react with hydrogen ions to yield nitrous acid ($HNO_2$), and the acid is efficiently yielded in cases when the pH of the aqueous solution is 7 or less, preferably 5 or less, more preferably 4 or less. From the standpoint of ease of handling, especially preferred of such reagents is an aqueous nitrous-acid solution obtained by reaction with hydrochloric acid or sulfuric acid in an aqueous solution.

In the reagent which reacts with primary amino groups to yield a diazonium salt or a derivative thereof, the concentration of nitrous acid or a nitrous acid salt is preferably in the range of 0.01-1% by weight, more preferably in the range of 0.05-0.5% by weight. In cases when the concentration thereof is 0.01% or higher, a sufficient effect is obtained. In cases when the concentration thereof is 1% by weight or less, the solution is easy to handle.

The aqueous solution of nitrous acid preferably has a temperature of 15-45° C. In cases when the temperature thereof is 15° C. or higher, a sufficient reaction rate is obtained. In cases when the temperature thereof is 45° C. or lower, the nitrous acid is less apt to decompose and, hence, the solution is easy to handle.

The period during which the polyamide is in contact with the aqueous solution of nitrous acid may be any period sufficient for a diazonium salt and/or a derivative thereof to be yielded. Higher concentrations enable the treatment to be carried out in a short time period, while lower concentrations necessitate a long time period. Consequently, in the case of the solution having the concentration shown above, the contact period is preferably 10 minutes or shorter, more preferably 3 minutes or shorter. Methods for the contact are not particularly limited. A solution of the reagent may be applied to the polyamide, or the composite semipermeable membrane may be immersed in a solution of the reagent. The solvent for dissolving the reagent therein may be any solvent in which the reagent dissolves and which does not corrode the composite semipermeable membrane. The solution may contain a surfactant, acidic compound, alkaline compound, etc. so long as these ingredients do not inhibit the reaction between primary amino groups and the reagent.

Next, some of the diazonium salt or derivative thereof which has been yielded is converted to a different functional group. Some of the diazonium salt or derivative thereof is converted to a phenolic hydroxyl group, for example, by reaction with water. By bringing some of the diazonium salt or derivative thereof into contact with a solution containing chloride ions, bromide ions, cyanide ions, iodide ions, fluoroboric acid, hypophosphorous acid, sodium hydrogen sulfite, sulfite ions, an aromatic amine, hydrogen sulfide, thiocyanic acid, or the like, the diazonium salt or derivative thereof is converted to the corresponding functional group. Furthermore, by contact with an aromatic amine, a diazo coupling reaction is caused and aromatic groups can be introduced onto the membrane surface. One of those reagents may be used alone, or a mixture of two or more thereof may be used. The polyamide may be brought into contact, multiple times, with different reagents.

Examples of the reagent which causes a diazo coupling reaction include compounds having an electron-rich aromatic ring or heteroaromatic ring. Examples of the compounds having an electron-rich aromatic ring or heteroaromatic ring include unsubstituted heteroaromatic compounds, aromatic compounds having an electron-donating substituent, and heteroaromatic compounds having an electron-donating substituent. Examples of the electron-donating substituent include an amino group, ether group, thioether group, alkyl groups, alkenyl groups, alkynyl groups, and aryl groups. Specific examples of those compounds include aniline, methoxyaniline in which the methoxy group has been bonded to the benzene ring in an ortho, meta, or para position, phenylenediamine in which the two amino groups have been bonded to the benzene ring in ortho, meta, or para positions, 1,3,5-triaminobenzene, 1,2,4-triaminobenzene, 3,5-diaminobenzoic acid, 3-aminobenzylamine, 4-aminobenzylamine, sulfanilic acid, 3,3'-dihydroxybenzidine, 1-aminonaphthalene, 2-aminonaphthalene, and N-alkylation products of these compounds.

The amino-group-containing compounds, among these reagents, increase the ratio of (molar equivalent of amino groups)/(molar equivalent of amide groups) of the separation functional layer and hence reduce the durability. Suitable electron-donating substituents are an ether group, thioether group, alkyl groups, alkenyl groups, alkynyl groups, and aryl groups. In the case of selecting an amino group, it is preferred to suitably regulate the amount of the compound to be reacted so that the amount of amino groups is within the range according to the present invention.

3. Use of the Composite Semipermeable Membrane

The composite semipermeable membrane of the present invention is suitable for use as a spiral type composite semipermeable membrane element produced by winding the composite semipermeable membrane around a cylindrical water collection tube having a large number of perforations, together with a raw-water channel member such as a plastic net and a permeate channel member such as tricot and optionally with a film for enhancing pressure resistance. Furthermore, such elements can be connected serially or in parallel and housed in a pressure vessel, thereby configuring a composite semipermeable membrane module.

Moreover, the composite semipermeable membrane or the element or module thereof can be combined with a pump for supplying raw water thereto, a device for pretreating the raw water, etc., thereby configuring a fluid separator. By using this fluid separator, raw water can be separated into permeate such as potable water and concentrate which has not passed through the membrane. Thus, water suited for a purpose can be obtained.

The composite semipermeable membrane of the present invention and fluid separation elements employing the composite semipermeable membrane can be used at an operation pressure in the low-pressure range of, for example, 0.1-3 MPa, more preferably 0.1-1.55 MPa, while maintaining a high permeation rate. Since the operation pressure can be low, pumps and the like having a lower capacity can be used, making it possible to attain a reduction in electric power consumption and a reduction in fresh-water production cost. Operation pressures lower than 0.1 MPa tend to result in a decrease in permeation rate, while operation pressures exceeding 3 MPa are prone to increase the quantity of electric power consumed by the pump, etc. and to result in membrane clogging due to fouling.

The composite semipermeable membrane of the present invention, when used for 24-hour filtration at 25° C. using an aqueous sodium chloride solution having a pH of 6.5 and a concentration of 2,000 mg/L at an operation pressure of 1.55 MPa, preferably has a permeation rate of 0.50-3.0 $m^3/m^2$/day. Such a composite semipermeable membrane can be produced, for example, by suitably selecting the production process described above. The permeation rate of 0.50-3.0 $m^3/m^2$/day renders stable fresh-water production possible while appropriately inhibiting fouling. From the standpoint of practical use, the permeation rate is more preferably 0.80-3.0 $m^3/m^2$/day.

There are cases where sewage to be treated with the composite semipermeable membrane of the present invention contains poorly biodegradable organic substances, e.g., surfactants, which have not been completely decomposed by a biological treatment. In cases when such sewage is treated with conventional composite semipermeable membranes, the surfactants are adsorbed onto the membrane surfaces, undesirably resulting in a decrease in permeation rate. In contrast, the composite semipermeable membrane of the present invention has a high permeation rate and the property of readily releasing membrane-fouling substances and can hence stably exhibit the performances.

The composite semipermeable membrane of the present invention is highly able to inhibit membrane-fouling substances from adhering thereto. Specifically, in cases when an aqueous solution having a temperature of 25° C., a pH of 6.5, and an NaCl concentration of 2,000 mg/L is filtrated for 1 hour at a pressure of 1.55 MPa and the amount of the resultant permeate is expressed by F1 and when the aqueous solution to which polyoxyethylene(10) octylphenyl ether has been added in a concentration of 100 mg/L is subsequently filtrated for 1 hour and the amount of the resultant permeate is expressed by F2, then the value of F2/F1 is preferably 0.80 or larger. The value of F2/F1 is more preferably 0.90 or larger. By using such composite semipermeable membrane, membrane surface fouling is rendered less apt to occur and a high permeation rate can be stably maintained over a long period.

EXAMPLES

The present invention will be explained below by reference to Examples, but the present invention is not limited to the following Examples in any way.

(NaCl Removal Ratio)

Evaluation water regulated so as to have a temperature of 25° C., pH of 7, and sodium chloride concentration of 2,000 ppm was supplied to a composite semipermeable membrane at an operation pressure of 1.55 MPa to perform a membrane filtration treatment. The feed water and the permeate were examined for electrical conductivity with an electrical conductivity meter manufactured by Toa Electronics Ltd., thereby obtaining the practical salinity, i.e., NaCl concentration, of each. The NaCl removal ratio was calculated on the basis of the thus-obtained NaCl concentrations and the following equation.

NaCl removal ratio (%)=100×{1−(NaCl concentration in permeate)/(NaCl concentration in feed water)}

(Permeation Rate)

In the test shown in the preceding section, the rate of permeation of the feed water (aqueous NaCl solution) through the membrane was measured. The amount was expressed in terms of water permeation rate ($m^3$) per membrane area of $m^2$ per day and this rate was taken as the membrane permeation flux ($m^3/m^2$/day).

Permeation rate after fouling was evaluated in the following manner. At 25° C., an aqueous solution having a pH of 6.5 and an NaCl concentration of 2,000 mg/L was filtrated for 1 hour at a pressure of 1.55 MPa and the amount of the resultant permeate was expressed by F1. Subsequently, the aqueous solution to which polyoxyethylene (10) octylphenyl ether had been added in a concentration of 100 mg/L was filtrated for 1 hour and the amount of the resultant permeate was expressed by F2. The value of F2/F1 was calculated.

(Durability)

A composite semipermeable membrane was immersed for 20 hours in an aqueous sulfuric acid solution having a pH of 1. The durability (chemical resistance) of the composite membrane was determined from the difference in salt removal ratio between before and after the immersion.

SP ratio=[100−(salt removal ratio after immersion)]/ [100−(salt removal ratio before immersion)]

SP is an abbreviation for substance permeation.

(Root-Mean-Square Surface Roughness)

A piece of 1-cm square was cut out from a composite semipermeable membrane which had been washed with ultrapure water and air-dried, and was applied to a slide glass with a double-faced adhesive tape. The separation functional layer was examined for root-mean-square surface roughness (RMS) with an atomic force microscope (Nanoscope Ma, manufactured by Digital Instruments) in the tapping mode. As a cantilever was used NCHV-1, manufactured by Veeco Instruments Inc. The measurement was made at ordinary temperature and ordinary pressure. The scanning speed was 1 Hz. With respect to the number of samples, a 512-pixcel square was examined. As an analysis software, Gwyddion was used. The results of the examination were subjected to a one-dimensional base-line correction (inclination correction) with respect to both X axis and Y axis to determine the root-mean-square surface roughness.

(Analysis of Polyamide for Functional Groups by $^{13}C$ Solid NMR Spectroscopy)

An examination of a polyamide by $^{13}C$ solid NMR spectroscopy is shown below. First, a composite semipermeable membrane including a polyamide was formed on a supporting membrane by the production method shown hereinabove. Thereafter, the substrate was physically peeled from the composite semipermeable membrane to recover the porous supporting layer and the polyamide. The porous supporting layer and the polyamide were allowed to stand still at 25° C. for 24 hours and dried thereby, and were then introduced little by little into a beaker containing dichloromethane. The contents were stirred to dissolve away the polymer constituting the porous supporting layer. The insoluble matter in the beaker was recovered with a filter paper and washed with dichloromethane several times. The polyamide recovered was dried in a vacuum dryer to remove the remaining dichloromethane. The polyamide obtained was freeze-pulverized to obtain a powdery sample, which was placed in a sample tube for solid NMR spectroscopy. The sample tube was closed and subjected to an examination by $^{13}C$ solid NMR spectroscopy based on the CP/MAS method and DD/MAS method. For the $^{13}C$ solid NMR spectroscopy, use can be made, for example, of CMX-300, manufactured by Chemagnetics. The spectrum obtained was subjected to peak separation into the peaks assigned to carbon atoms having respective functional groups bonded thereto, and the content of each functional group was determined from the area of the corresponding one of the separated peaks.

Production of Composite Semipermeable Membranes

Comparative Example 1

A 15.0% by weight DMF solution of a polysulfone (PSf) was cast, under the conditions of 25° C., on nonwoven polyester fabric configured of long fibers, and this nonwoven fabric was immediately immersed in pure water and allowed to stand therein for 5 minutes, thereby producing a supporting membrane including a porous supporting layer having a thickness of 40 μm.

Next, this supporting membrane was immersed in a 3.5% by weight aqueous solution of m-PDA, and the excess aqueous solution was then removed. Furthermore, an n-decane solution in which TMC had been dissolved in a concentration of 0.14% by weight was applied thereto so that the surface of the porous supporting layer was completely wetted by the n-decane solution. Subsequently, in order to remove the excess solution from the membrane, the membrane was vertically held to allow the excess solution to flow down and 25° C. air was blown against the membrane with an air blower to dry the membrane. This membrane was then washed with 40° C. pure water. The composite semipermeable membrane thus obtained was examined for root-mean-square surface roughness, functional-group content, membrane performance just after membrane production, membrane performance after fouling, and chemical resistance. As a result, the values shown in Table 1 were obtained.

Comparative Example 2

The composite semipermeable membrane obtained in Comparative Example 1 was kept in contact with an aqueous solution containing 100 ppm by weight poly(acrylic acid) (weight-average molecular weight, 5,000; manufactured by Wako Pure Chemical Industries, Ltd.) and 0.1% by weight DMT-MM, at 20° C. for 24 hours and then washed with water. The composite semipermeable membrane obtained was evaluated. As a result, the membrane performance values shown in Table 1 were obtained.

Example 1

The composite semipermeable membrane obtained in Comparative Example 2 was immersed for 1 minute in 0.1% by weight aqueous sodium nitrite solution regulated so as to have a pH of 3 and a temperature of 35° C. The pH adjustment of the sodium nitrite was conducted using sulfuric acid. Next, the composite semipermeable membrane was immersed in 0.1% by weight aqueous sodium nitrite solution at 35° C. for 2 minutes, thereby obtaining a composite semipermeable membrane of Example 1. The composite semipermeable membrane obtained was evaluated. As a result, the membrane performance values shown in Table 1 were obtained.

Example 2

The composite semipermeable membrane obtained in Comparative Example 2 was immersed for 1 minute in 0.2% by weight aqueous sodium nitrite solution regulated so as to have a pH of 3 and a temperature of 35° C. The pH adjustment of the sodium nitrite was conducted using sulfuric acid. Next, the composite semipermeable membrane was immersed in 0.1% by weight aqueous sodium nitrite solution at 35° C. for 2 minutes, thereby obtaining a composite semipermeable membrane of Example 2. The composite semipermeable membrane obtained was evaluated. As a result, the membrane performance values shown in Table 1 were obtained.

Example 3

The composite semipermeable membrane obtained in Comparative Example 2 was immersed for 1 minute in 0.3% by weight aqueous sodium nitrite solution regulated so as to have a pH of 3 and a temperature of 35° C. The pH adjustment of the sodium nitrite was conducted using sulfuric acid. Next, the composite semipermeable membrane was immersed in 0.1% by weight aqueous sodium nitrite solution at 35° C. for 2 minutes, thereby obtaining a composite semipermeable membrane of Example 3. The composite semipermeable membrane obtained was evaluated. As a result, the membrane performance values shown in Table 1 were obtained.

Example 4

The composite semipermeable membrane obtained in Comparative Example 1 was kept in contact with an aqueous solution containing 100 ppm by weight poly(acrylic acid) (weight-average molecular weight, 2,000; manufactured by Toagosei Co., Ltd.) and 0.1% by weight DMT-MM, at 20° C. for 24 hours and then washed with water. Thereafter, the composite semipermeable membrane was immersed for 1 minute in 0.3% by weight aqueous sodium nitrite solution regulated so as to have a pH of 3 and a temperature of 35° C. The pH adjustment of the sodium nitrite was conducted using sulfuric acid. Next, the composite semipermeable membrane was immersed in 0.1% by weight aqueous sodium nitrite solution at 35° C. for 2 minutes, thereby obtaining a composite semipermeable membrane of Example 4. The composite semipermeable membrane obtained was evaluated. As a result, the membrane performance values shown in Table 1 were obtained.

Example 5

The composite semipermeable membrane obtained in Comparative Example 1 was kept in contact with an aqueous solution containing 100 ppm by weight poly(acrylic acid) (weight-average molecular weight, 25,000; manufactured by Wako Pure Chemical Industries, Ltd.) and 0.1% by weight DMT-MM, at 20° C. for 24 hours and then washed with water. Thereafter, the composite semipermeable membrane was immersed for 1 minute in 0.3% by weight aqueous sodium nitrite solution regulated so as to have a pH of 3 and a temperature of 35° C. The pH adjustment of the sodium nitrite was conducted using sulfuric acid. Next, the composite semipermeable membrane was immersed in 0.1% by weight aqueous sodium nitrite solution at 35° C. for 2 minutes, thereby obtaining a composite semipermeable membrane of Example 5. The composite semipermeable membrane obtained was evaluated. As a result, the membrane performance values shown in Table 1 were obtained.

Example 6

The composite semipermeable membrane obtained in Comparative Example 1 was kept in contact with an aqueous solution containing 100 ppm by weight poly(acrylic acid) (weight-average molecular weight, 500,000; manufactured by Toagosei Co., Ltd.) and 0.1% by weight DMT-MM, at 20° C. for 24 hours and then washed with water. Thereafter, the composite semipermeable membrane was immersed for 1 minute in 0.3% by weight aqueous sodium nitrite solution regulated so as to have a pH of 3 and a temperature of 35° C. The pH adjustment of the sodium nitrite was conducted using sulfuric acid. Next, the composite semipermeable membrane was immersed in 0.1% by weight aqueous sodium nitrite solution at 35° C. for 2 minutes, thereby obtaining a composite semipermeable membrane of Example 6. The composite semipermeable membrane obtained was evaluated. As a result, the membrane performance values shown in Table 1 were obtained.

Example 7

The composite semipermeable membrane obtained in Comparative Example 1 was kept in contact with an aqueous solution containing 100 ppm by weight poly(acrylic acid) (weight-average molecular weight, 1,250,000; manufactured by Wako Pure Chemical Industries, Ltd.) and 0.1% by weight DMT-MM, at 20° C. for 24 hours and then washed with water. Thereafter, the composite semipermeable membrane was immersed for 1 minute in 0.3% by weight aqueous sodium nitrite solution regulated so as to have a pH of 3 and a temperature of 35° C. The pH adjustment of the sodium nitrite was conducted using sulfuric acid. Next, the composite semipermeable membrane was immersed in 0.1% by weight aqueous sodium nitrite solution at 35° C. for 2 minutes, thereby obtaining a composite semipermeable membrane of Example 7. The composite semipermeable membrane obtained was evaluated. As a result, the membrane performance values shown in Table 1 were obtained.

Comparative Example 3

The composite semipermeable membrane obtained in Comparative Example 1 was kept in contact with a 100 ppm by weight aqueous solution of poly(acrylic acid) (weight-average molecular weight, 5,000; manufactured by Wako Pure Chemical Industries, Ltd.) at 20° C. for 24 hours and then washed with water. The composite semipermeable membrane obtained was evaluated. As a result, the membrane performance values shown in Table 1 were obtained.

Comparative Example 4

The composite semipermeable membrane obtained in Comparative Example 1 was immersed for 1 minute in 0.3% by weight aqueous sodium nitrite solution regulated so as to have a pH of 3 and a temperature of 35° C. The pH adjustment of the sodium nitrite was conducted using sulfuric acid. Next, the composite semipermeable membrane was immersed in 0.1% by weight aqueous sodium nitrite solution at 35° C. for 2 minutes, thereby obtaining a composite semipermeable membrane of Comparative Example 4. The composite semipermeable membrane thus obtained was examined for functional-group content in the polyamide, root-mean-square surface roughness, membrane performance just after membrane production, membrane performance after fouling, and chemical resistance. As a result, the values shown in Table 1 were obtained.

Example 8

The composite semipermeable membrane obtained in Comparative Example 4 was immersed in an aqueous solution containing 0.1% by weight DMT-MM and having a pH of 4, at 25° C. for 24 hours and then washed with water, thereby obtaining a composite semipermeable membrane of Example 8. The composite semipermeable membrane obtained was evaluated. As a result, the membrane performance values shown in Table 1 were obtained.

Comparative Example 5

The composite semipermeable membrane obtained in Comparative Example 4 was immersed in 0.05% by weight aqueous m-PDA solution at 35° C. for 1 minute to conduct a diazo coupling reaction. Subsequently, the composite semipermeable membrane was immersed in an aqueous solution containing 100 ppm by weight poly(acrylic acid) (weight-average molecular weight, 5,000; manufactured by Wako Pure Chemical Industries, Ltd.) and 0.1% by weight DMT-MM and having a pH of 4, at 25° C. for 24 hours and then washed with pure water, thereby obtaining a composite semipermeable membrane of Comparative Example 5. The composite semipermeable membrane obtained was evaluated. As a result, the membrane performance values shown in Table 1 were obtained.

Comparative Example 6

The composite semipermeable membrane obtained in Comparative Example 1 was immersed for 2 minutes in an aqueous solution obtained by adding hydrochloric acid as an acid catalyst, so as to result in a concentration thereof of 0.1 mol/L, to an aqueous solution containing both 0.5% by weight poly(vinyl alcohol) (degree of saponification, 88%; weight-average molecular weight, 2,000; manufactured by Nacalai Tesque, Inc.) and 0.2% by weight glutaraldehyde. The membrane was vertically held for 1 minute to allow the excess solution to flow down and then dried in a hot-air drying oven at 90° C. for 4 minutes, thereby obtaining a composite semipermeable membrane including a separation functional layer coated with poly(vinyl alcohol). Thereafter, the composite semipermeable membrane was immersed for 1 minute in 0.3% by weight aqueous sodium nitrite solution regulated so as to have a pH of 3 and a temperature of 35° C. The pH adjustment of the sodium nitrite was conducted using sulfuric acid. Next, the composite semipermeable membrane was immersed in 0.1% by weight aqueous sodium nitrite solution at 35° C. for 2 minutes, thereby obtaining a composite semipermeable membrane of Comparative Example 6. The composite semipermeable membrane obtained was evaluated. As a result, the membrane performance values shown in Table 1 were obtained.

TABLE 1

| | Functional-group content Amino group/ Amide group (—) | Membrane surface Root-mean-Square surface roughness (nm) | Membrane performance just after membrane production | | Membrane performance after fouling | | Chemical resistance SP ratio (—) |
|---|---|---|---|---|---|---|---|
| | | | NaCl removal ratio (%) | Membrane permeation flux ($m^3/m^2/day$) | Membrane permeation flux ($m^3/m^2/day$) | F2/F1 (—) | |
| Example 1 | 0.18 | 81 | 99.4 | 0.95 | 0.87 | 0.92 | 1.15 |
| Example 2 | 0.15 | 85 | 99.4 | 1.15 | 1.04 | 0.90 | 1.12 |
| Example 3 | 0.11 | 82 | 99.4 | 1.36 | 1.20 | 0.88 | 1.02 |
| Example 4 | 0.10 | 82 | 99.4 | 1.31 | 1.17 | 0.89 | 1.04 |
| Example 5 | 0.11 | 83 | 99.4 | 1.39 | 1.22 | 0.88 | 1.06 |
| Example 6 | 0.11 | 80 | 99.4 | 1.42 | 1.25 | 0.88 | 1.04 |
| Example 7 | 0.12 | 86 | 99.4 | 1.44 | 1.22 | 0.85 | 1.05 |
| Example 8 | 0.11 | 83 | 99.4 | 1.32 | 0.94 | 0.71 | 1.00 |
| Comparative Example 1 | 0.55 | 83 | 99.2 | 1.01 | 0.51 | 0.50 | 1.54 |
| Comparative Example 2 | 0.45 | 82 | 99.2 | 0.93 | 0.83 | 0.89 | 1.44 |
| Comparative Example 3 | 0.54 | 84 | 99.2 | 0.99 | 0.51 | 0.52 | 1.48 |
| Comparative Example 4 | 0.12 | 79 | 99.4 | 1.50 | 0.76 | 0.51 | 1.05 |
| Comparative Example 5 | 0.24 | 82 | 99.3 | 1.28 | 1.18 | 0.92 | 1.36 |
| Comparative Example 6 | 0.20 | 30 | 99.3 | 0.79 | 0.57 | 0.72 | 1.24 |

As described above, the composite semipermeable membrane of the present invention has a high permeation rate, high salt removal performance, and excellent performance stability and can stably retain the high performances over a long period.

While the invention has been described in detail and with reference to specific embodiments thereof, it will be apparent to one skilled in the art that various changes and modifications can be made therein without departing from the spirit and scope thereof. This application is based on a Japanese patent application filed on Oct. 27, 2015 (Application No. 2015-211016), the contents thereof being incorporated herein by reference.

INDUSTRIAL APPLICABILITY

By using the composite semipermeable membrane of the present invention, raw water can be separated into permeate such as potable water and concentrate which has not passed through the membrane. Thus, water suited for a purpose can be obtained. The composite semipermeable membrane of the present invention is especially suitable for use in the desalination of brackish water or seawater.

The invention claimed is:

1. A composite semipermeable membrane comprising:
a supporting membrane comprising a substrate and a porous supporting layer; and
a separation functional layer disposed on the porous supporting layer, wherein
the separation functional layer comprises a crosslinked polyamide and a hydrophilic polymer having an acidic group,
the hydrophilic polymer includes poly(acrylic acid),
the hydrophilic polymer is bonded with the crosslinked polyamide of the separation functional layer via amide bonds formed by the crosslinked polyamide terminal amino groups and the hydrophilic polymer carboxy groups, and
in the separation functional layer, a ratio of (molar equivalent of amino groups)/(molar equivalent of amide groups) is 0.10 or more and 0.12 or less, and
a copolymerization ratio of (number of moles of monomer(s) having the acidic group)/(number of moles of the monomer(s) constituting the hydrophilic polymer) in the monomer(s) constituting the hydrophilic polymer is 100% (1.0).

2. The composite semipermeable membrane according to claim 1, wherein the separation functional layer has a surface having a root-mean-square surface roughness of 50 nm or higher.

3. A process for producing a composite semipermeable membrane comprising a substrate, a porous supporting layer formed on the substrate, and a separation functional layer formed on the porous supporting layer,
the process comprising performing the following steps (a), (b), and (c) in this order to thereby form the separation functional layer:
(a) a step in which an aqueous solution containing a polyfunctional amine and an organic solvent containing a polyfunctional acid halide are used to conduct interfacial polycondensation on a surface of a supporting membrane comprising the substrate and the porous supporting layer, thereby forming a crosslinked polyamide;
(b) a step in which a hydrophilic polymer, having an acidic group and including poly(acrylic acid), is introduced onto the crosslinked polyamide obtained in the step (a), so as to form amide bonds from the crosslinked polyamide amino groups and the poly(acrylic acid) carboxy groups; and
(c) a step in which the crosslinked polyamide is brought into contact with a reagent for converting primary amino groups of the crosslinked polyamide into a functional group,
wherein a copolymerization ratio of (number of moles of monomer(s) having the acidic group)/(number of moles of the monomer(s) constituting the hydrophilic polymer) in the monomer(s) constituting the hydrophilic polymer is 100% (1.0), and
wherein the ratio of (molar equivalent of amino groups)/(molar equivalent of amide groups) is 0.10 or more and 0.12 or less.

4. The process for producing a composite semipermeable membrane according to claim 3, wherein the step (b) is a step in which the crosslinked polyamide is brought into contact with both a reagent for converting a carboxy group into a carboxylic acid derivative and a solution containing a hydrophilic polymer having an acidic group.

5. The process for producing a composite semipermeable membrane according to claim 3, wherein the step (c) is a contact reaction in which the crosslinked polyamide is brought into contact with a reagent which reacts with a primary amino group to yield a diazonium salt or a derivative thereof.

6. The composite semipermeable membrane according to claim 2, wherein the crosslinked polyamide and the hydrophilic polymer are bonded to each other by amide bonds.

* * * * *